May 27, 1969     W. F. DUGAN ET AL     3,447,000
EXPLOSION-PROOF BLENDER MOTOR AND HOUSING
Filed April 24, 1967
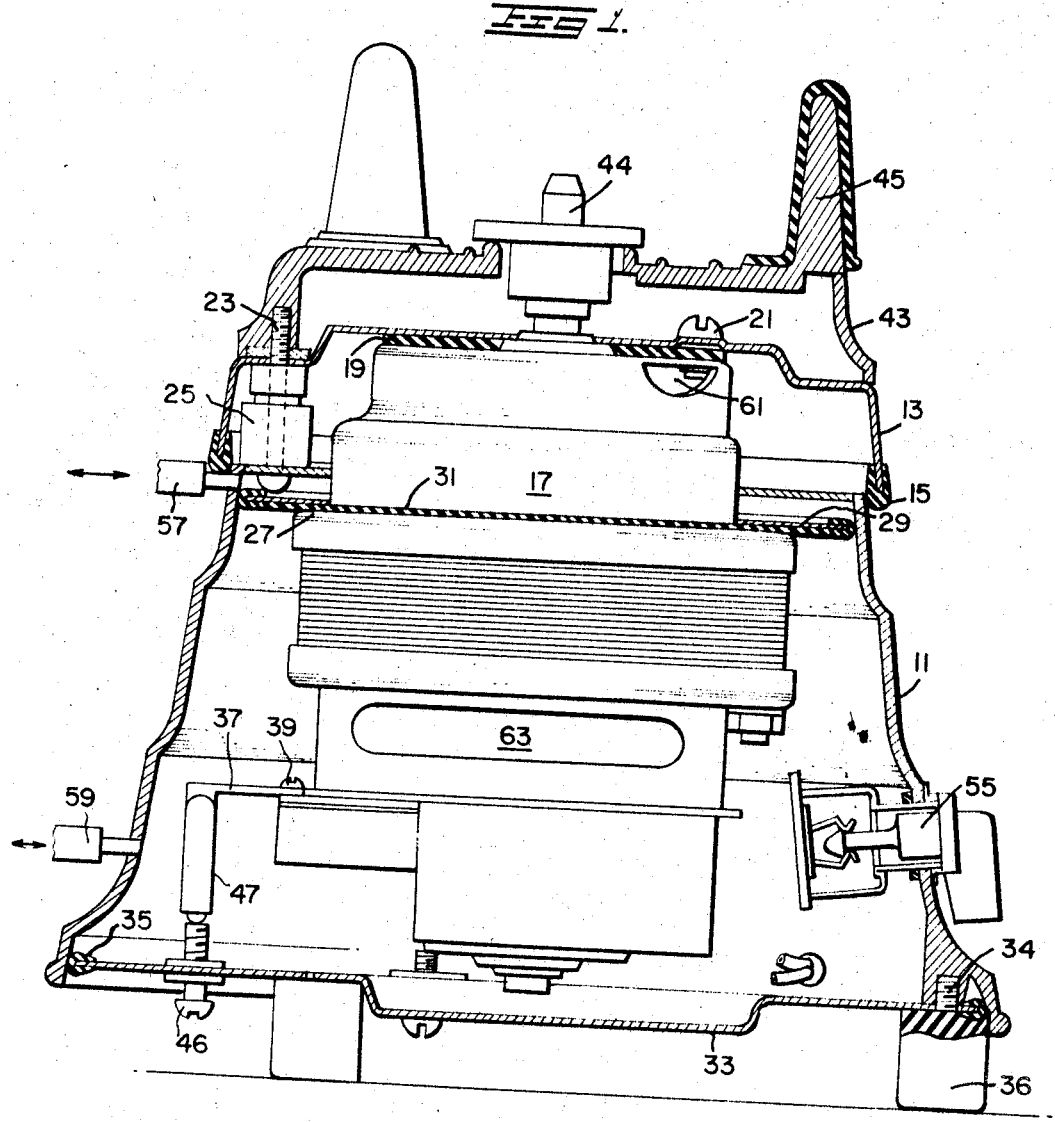
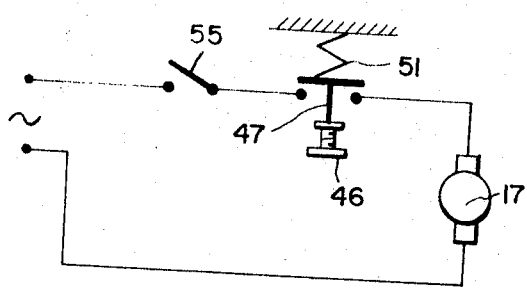
INVENTORS
WILLIAM F. DUGAN
ROY L. SWANKE

United States Patent Office 3,447,000
Patented May 27, 1969

3,447,000
EXPLOSION-PROOF BLENDER MOTOR AND HOUSING
William F. Dugan, Stamford, and Roy L. Swanke, Newington, Conn., assignors to Dynamics Corporation of America, New York, N.Y., a corporation of New York
Filed Apr. 24, 1967, Ser. No. 633,218
Int. Cl. H02k 7/14
U.S. Cl. 310—50  9 Claims

ABSTRACT OF THE DISCLOSURE

An electrical blender having a motor sealed therein in an airtight condition with means for circulating air under pressure through the housing and past the motor. A switch is provided which is responsive to the pressure within the housing so as to stop the motor if the air supply fails.

---

This invention relates generally to mixing devices and more particularly to blending devices which are sealed so as to provide an explosion-proof, motor driven appliance.

Mixing devices are now commonly used in all phases of commercial, industrial and household uses. One of the standard items in this field is the high speed blending device. Under normal household use, these devices are sufficiently safe with a normal housing which allows a free flow of air for cooling the high speed motor. However, in many laboratory and industrial uses, these devices must operate in an atmosphere which may contain inflammable and/or explosive gases and dust. With the arcing and heat inherent in the operation of electric motors, an open housing could not be used in such environment. Although there are many ways to enclose a motor so as to provide airtight operation, the use of high speed blending motors presents a special problem. Because of their high speed, these motors must be constantly cooled either by liquid or air. The most economical cooling means is air, particularly since most of the available high speed motors are air-cooled.

Accordingly, it is an object of this invention to provide an explosion-proof motor which is air-cooled.

Another object of this invention is to provide an air-cooled, explosion-proof motor which is automatically shut down if the air-cooling flow fails.

These and other objects of the invention will become apparent from the following description when taken in conjunction with the drawings wherein:

FIG. 1 is a cross-sectional view of one type of blender embodying the present invention; and FIG. 2 is a schematic circuit diagram of the control system for the blender of FIG. 1.

Turning now more specifically to the drawings, there is shown in FIG. 1 a blender having a lower housing 11 and an upper housing 13 seated thereon with an annular airtight seal 15 therebetween.

An electric motor 17 is mounted within the housing and secured to the upper section 13 by means such as screws 21. In order to maintain the airtight condition of the housing, a washer seal 19 is provided between the upper part of the motor and the inside of the upper housing.

The upper and lower housings are secured together by means such as screws 23 and appropriate spacers 25. A circular flange 29 supports another annular seal 33 which rests upon a shoulder 27 of the motor 17. Seal 31 wedges firmly against the inner wall of lower housing 11 for reasons which will be discussed below.

The open mouth of lower housing 11 is covered by means of a semi-rigid flexible plate 33 which carries a seal 35 about its periphery. The plate and seal are secured to lower housing 11 by means such as screws 34 which may be part of the blender legs 36.

A cap 43 may be mounted on upper housing 13 so as to be held in place by screws 23. The motor shaft extends upwardly through cap 43 and terminates in the standard driving stud 44 which mates with the blender jar (not shown). Additionally, the blender may be provided with upstanding fingers 45 which maintain the jar in place.

A further adjustable screw 46 extends through the flexible plate 33 in a sealed manner as shown. Screw 46 either contacts or releases microswitch 47 depending upon the particular position of the flexible plate 33.

A standard off-on switch 55 extends through lower housing 11 in a sealed manner. The various electrical leads are not shown for purposes of clarity.

A first conduit extends outwardly from the lower housing 11 above the flange 29 and circular seal 31.

A second conduit 59 extends outwardly from lower housing 11 below the seal 31. Each of the conduits 57 and 59 may be connected to a closed forced air pressure system which is isolated from the atmosphere within which the device is operating.

FIG. 2 illustrates diagrammatically that the motor 17 cannot operate unless both the manual switch and the microswitch are closed since these two switches are connected in series.

In operation, the closed forced air system is initiated so as to circulate air between conduits 57 and 59. As indicated by the arrows, air may flow in either direction. Because of the location of flange 29 and seal 31, the circulating air must pass between openings 61 and 63 of the motor, thereby cooling the motor as it operates.

The forced air under pressure causes the bottom plate 33 to flex outwardly in a "oil can" effect. This outward flexure causes screw 46 to move away from microswitch 47. Microswitch 47 is biased to the closed position by means such as spring 51. Subsequently, manual switch 55 may be closed so as to operate the motor.

If there is any failure of the air supply between conduits 57 and 59, the interior of the housing will return to a normal pressure, and the flexible plate will move screw 46 upwardly so as to contact and open microswitch 47.

Screw 46 may be adjusted so as to provide a means for setting the operation of the microswitch at various predetermined operating pressures.

In addition to the above-discussed safety feature, the present invention also protects against possible explosive hazards during operation. If any minute holes exist in the housing or a slight leakage should occur around the seals, sufficient pressure would still be supplied to the housing to prevent shutdown. However, there would be a constant outward flow of purging air through such leakage areas so as to keep the explosive atmosphere out of the motor housing.

In view of the fact that purging air is always present when the device is operative, the blender may use relatively inexpensive motors and still maintain the explosion-resistant feature. Additionally, expensive gastight gaskets would not be necessary around the drive shaft of the motor.

It will be obvious that individual components may be substituted with equivalent parts in the above-illustrated and described example. Accordingly, the invention is to be limited only by the scope of the following claims.

We claim:
1. A mixing device comprising.
a housing,
an electric motor within said housing,
a drive shaft driven by said motor including a mating coupling extending outwardly from said housing,
means for airtight sealing the interior of said housing, means for supplying air under pressure to the interior of said housing, means for exhausting said air under pressure from said housing, means for directing said air under pressure from said supplying means through said motor to said exhausting means, a manual switch for supplying current to said motor, and normally open switch means coupled between said manual switch and said motor, and pressure sensitive means for closing said normally open switch means when the air pressure within said housing exceeds a predetermined amount.

2. The device of claim 1 wherein said normally open switch means comprises a microswitch, and wherein said pressure sensitive means comprises a semi-rigid flexible plate responsive to the said pressure for deactivating said switch.

3. The device of claim 2 wherein said semi-rigid flexible plate is the bottom plate of the mixing device.

4. The device of claim 3 further comprising adjustable means coupled to said flexible plate for varying the pressure point at which said microswitch is closed.

5. The device of claim 4 wherein said adjustable means comprises a screw extending through said base plate for contacting said microswitch.

6. A mixing device comprising, a sealed housing, an electric motor mounted within said housing and including a shaft extending outwardly therefrom, means for passing air under pressure through said housing and about said motor, a normally open pressure switch means interconnecting said motor to a source of power, and means responsive to a predetermined pressure within said housing for closing said pressure switch.

7. The mixing device of claim 6 wherein said means for closing said pressure switch is adjustable so as to provide a selectable operational pressure.

8. A mixing device comprising, a sealed housing, an electric motor mounted within said housing and including a shaft extending outwardly therefrom, means for passing air under pressure through said housing and about said motor, and switch means for interconnecting said motor to a source of power.

9. The mixing device of claim 8 wherein said switch means includes a pressure sensitive switch for disconnecting said motor from said power source when said air pressure within said housing falls below a predtermined level.

References Cited

UNITED STATES PATENTS

| | | | |
|---|---|---|---|
| 2,324,904 | 7/1943 | Canetta | 310—88 |
| 2,822,123 | 2/1958 | Cole | 310—88 |
| 2,885,962 | 5/1959 | Campbell | 310—88 |
| 3,064,148 | 11/1962 | Krouse | 310—85 |

WARREN E. RAY, *Primary Examiner.*

R. SKUDY, *Assistant Examiner.*

U.S. Cl. X.R.

259—1; 310—88